United States Patent
Carlson

(10) Patent No.: US 8,353,420 B1
(45) Date of Patent: Jan. 15, 2013

(54) THREADED CLOSURE

(75) Inventor: James D. Carlson, Tulsa, OK (US)

(73) Assignee: Map Group LLC, Tulsa, OK (US)

( * ) Notice: Subject to any disclaimer, the term of this patent is extended or adjusted under 35 U.S.C. 154(b) by 229 days.

(21) Appl. No.: 12/721,664

(22) Filed: Mar. 11, 2010

(51) Int. Cl.
*B65D 41/04* (2006.01)
*F16C 23/00* (2006.01)

(52) U.S. Cl. ........ 220/291; 220/288; 248/332; 248/342; 384/549; 384/583; 384/519; 384/252

(58) Field of Classification Search ................... 220/288, 220/291, 293, 303, 304, 316, 375; 248/317, 248/332, 340, 342; 384/548, 565, 252–260, 384/519, 583
See application file for complete search history.

(56) References Cited

U.S. PATENT DOCUMENTS

| | | | | |
|---|---|---|---|---|
| 2,870,934 A * | 1/1959 | Hill | ............................... | 220/263 |
| 3,734,584 A * | 5/1973 | Studer | ............................ | 384/565 |
| 4,288,001 A * | 9/1981 | Lankston | ....................... | 220/316 |
| 4,387,740 A | 6/1983 | Vanzant | | |
| 4,444,331 A * | 4/1984 | Lankston | ....................... | 220/304 |
| 6,454,117 B1 | 9/2002 | Pysher et al. | | |
| 6,663,149 B1 | 12/2003 | White | | |
| 6,685,380 B2 | 2/2004 | White et al. | | |
| 6,708,837 B2 * | 3/2004 | Smith | ............................ | 220/316 |
| 6,742,957 B2 | 6/2004 | Smith et al. | | |
| 6,786,670 B2 | 9/2004 | Smith | | |
| 6,886,709 B2 * | 5/2005 | Smith | ........................... | 220/316 |
| 7,051,897 B2 | 5/2006 | McGuire | | |
| 7,472,721 B2 | 1/2009 | White et al. | | |
| 2008/0257888 A1 * | 10/2008 | Lee | ................................ | 220/324 |

* cited by examiner

*Primary Examiner* — Anthony Stashick
*Assistant Examiner* — James N Smalley
(74) *Attorney, Agent, or Firm* — Molly D. McKay

(57) ABSTRACT

A horizontal hinged closure with a large diameter track ring attached directly to the rear of a female threaded head. The threaded female head is designed to removably attach to a male threaded structure. A bearing ring with cam followers that engage the track ring to allow the threaded head to be rotated relative to the male threaded structure to attach and remove the threaded head there from. The bearing ring is attached to a hinge arm that allows the removed threaded head to be moved away from the male threaded structure and then rotated about a vertical axis. Direct attachment of the large diameter track ring to the rear of the threaded head moves the center of gravity forward, resulting in the threaded head remaining essentially vertical when it is removed from the male threaded structure and thereby making it easier to reattach to the male threaded structure.

11 Claims, 5 Drawing Sheets

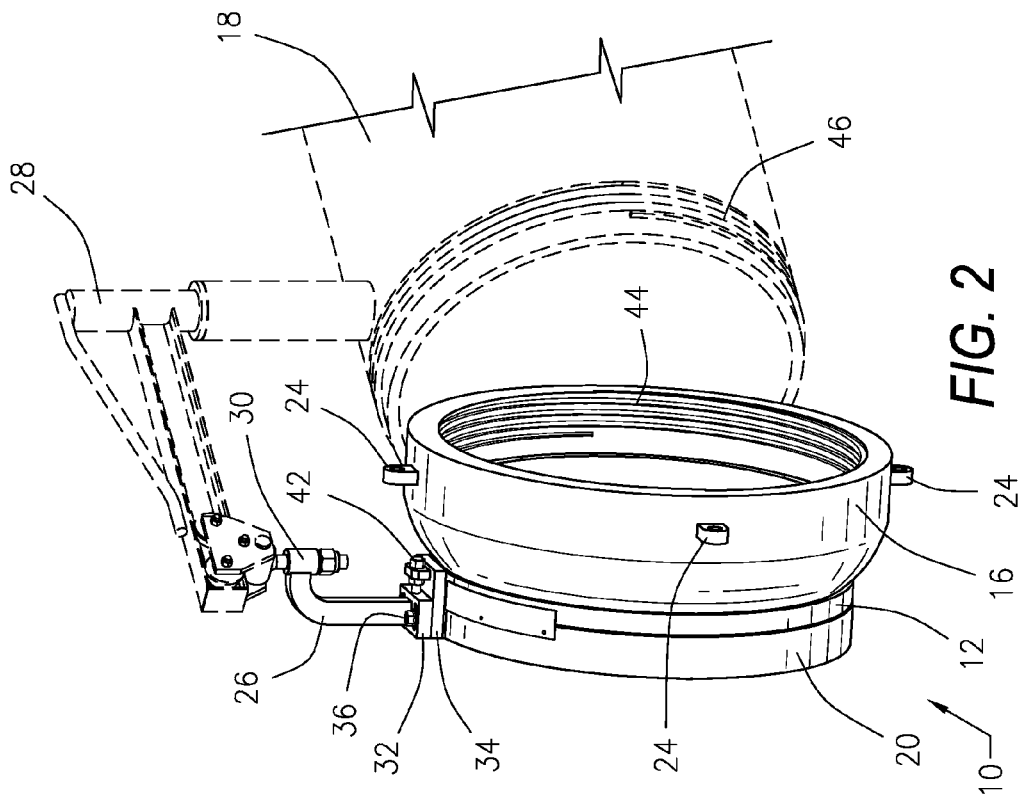
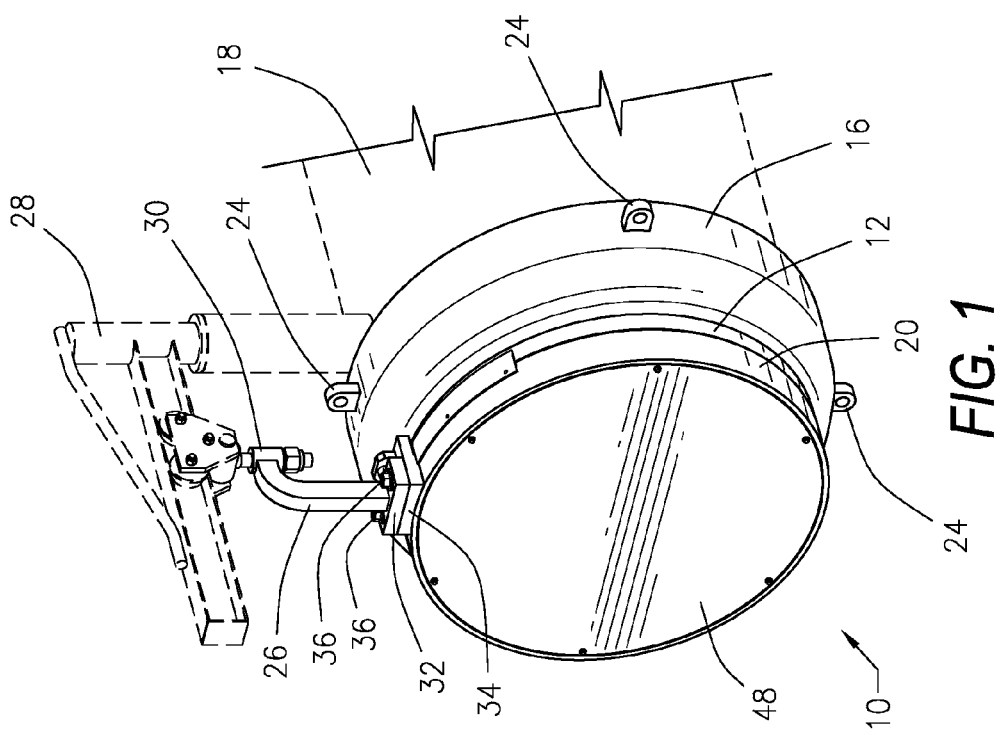

THREADED CLOSURE

BACKGROUND OF THE INVENTION

1. Field of the Invention

The present invention relates to a threaded closure for a large pipe or vessel and more particularly a horizontal hinged closure used for scraper traps, large O.C. filter units, launchers, receivers, and other similar installations.

2. Description of the Related Art

Referring now to FIG. 4, there is illustrated a typical prior art female threaded closure that employs a center mounted bearing located at the rear of the threaded head. The center mounted bearing serves as a means of suspending the threaded head whenever it is removed from the male threaded structure to which it attaches. Suspending the threaded closure is necessary to allow the threaded closure to be attached and removed from a male threaded structure since these closures can weigh several hundred or several thousand pounds and are generally too heavy to be handled without the aid of some type of suspending device.

One of the problems with prior art threaded closures of this type is that the center mounting arrangement causes the center of gravity to be located rearward on the head so that when the head is disengaged from the male threaded structure, the upper portion of the head tends to tilt forward and the lower portion of the head tends to tilt rearward. This tilted orientation of the head makes it difficult and time consuming to again raise and turn the head to the proper orientation to thread it back onto the male threaded structure.

The present invention addresses this problem by eliminating the center mounting arrangement and instead employing a large diameter track ring that attaches directly to the rear of the threaded head. The present invention also employs a bearing ring with cam followers that engage the track ring to allow the threaded head to be rotated relative to the male threaded structure. By rotating the threaded head in a counterclockwise manner, this loosens and removes the threaded head from the male threaded structure. Alternately, by turning the threaded head in a clockwise manner, this tightens and reattaches the threaded head to the male threaded structure.

As with prior art threaded heads, the bearing ring of the present invention is attached to a hinge arm that allows the threaded head to be moved linearly away from the male threaded structure once the threaded head is removed from the male threaded structure and also allows the threaded head to be rotated about a vertical axis once it is moved away from the male threaded head.

Because of the direct attachment of the large diameter track ring to the rear of the threaded head of the present invention, the center of gravity is moved forward of where it is located on the prior art female threaded closure of FIG. 4. Because of this shift in the center of gravity on the present invention, the threaded head does not tilt to any great extent when it is removed from the male threaded structure, and this makes aligning and reattaching the threaded head to the male threaded structure much easier and faster. In fact, employing the present invention, a single man can easily align and reattach a thousand pound threaded head to a male threaded structure in just a matter of minutes. To accomplish the same alignment and reattachment with a prior art threaded head of similar weight would normally take a couple of people anywhere from 30 minutes to an hour.

SUMMARY OF THE INVENTION

The present invention employs a large diameter track ring that attaches directly to the rear of a female threaded head that is designed to attach to a male threaded structure. The present invention also employs a bearing ring with cam followers that engage the track ring to allow the threaded head to be rotated clockwise and counterclockwise relative to the male threaded structure. By rotating the threaded head in a counterclockwise manner, this loosens and removes the threaded head from the male threaded structure. Alternately, by turning the threaded head in a clockwise manner, this tightens and reattaches the threaded head to the male threaded structure.

The bearing ring of the present invention is attached to a hinge arm that allows the threaded head to be moved horizontally or linearly away from the male threaded structure once the threaded head is removed from the male threaded structure. The hinge arm also includes a bearing that allows the threaded head to be rotated about a vertical axis once it is moved away from the male threaded head.

Because of the direct attachment of the large diameter track ring to the rear of the threaded head of the present invention, the center of gravity is moved forward of its location on prior art female threaded closures. This forward shift in the center of gravity on the present invention results in the threaded head remaining essentially vertical and not tilting to any great extent when it is removed from the male threaded structure, thereby preventing cross-threading and facilitating quick and easy reattachment of the threaded head to the male threaded structure.

BRIEF DESCRIPTION OF THE DRAWINGS

FIG. 1 is rear perspective view of a threaded closure constructed in accordance with a preferred embodiment of the present invention.

FIG. 2 is the threaded closure of FIG. 1 shown removed from the male threaded structure to which it attaches and moved away from and pivoted along a vertical axis relative to the male threaded structure so that the female threads of the threaded closure are visible.

DETAILED DESCRIPTION OF THE PREFERRED EMBODIMENT

Figure 3:
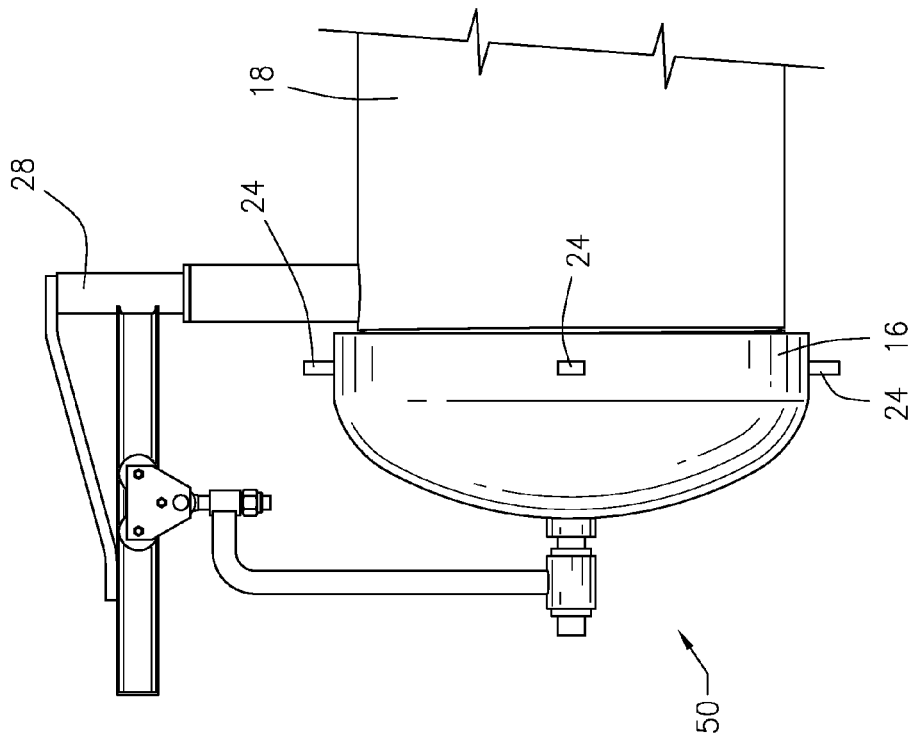
FIG. 3 is a side view of the threaded closure of FIG. 1 shown attached to the male threaded structure which is shown in outline.

Referring now to FIGS. 1, 2 and 3, there is illustrated a horizontal hinged threaded closure 10 constructed in accordance with a preferred embodiment of the present invention. The horizontal hinged threaded closure 10 is designed to attach to a male threaded structure 18, as will be described more fully hereafter.

Figure 5:
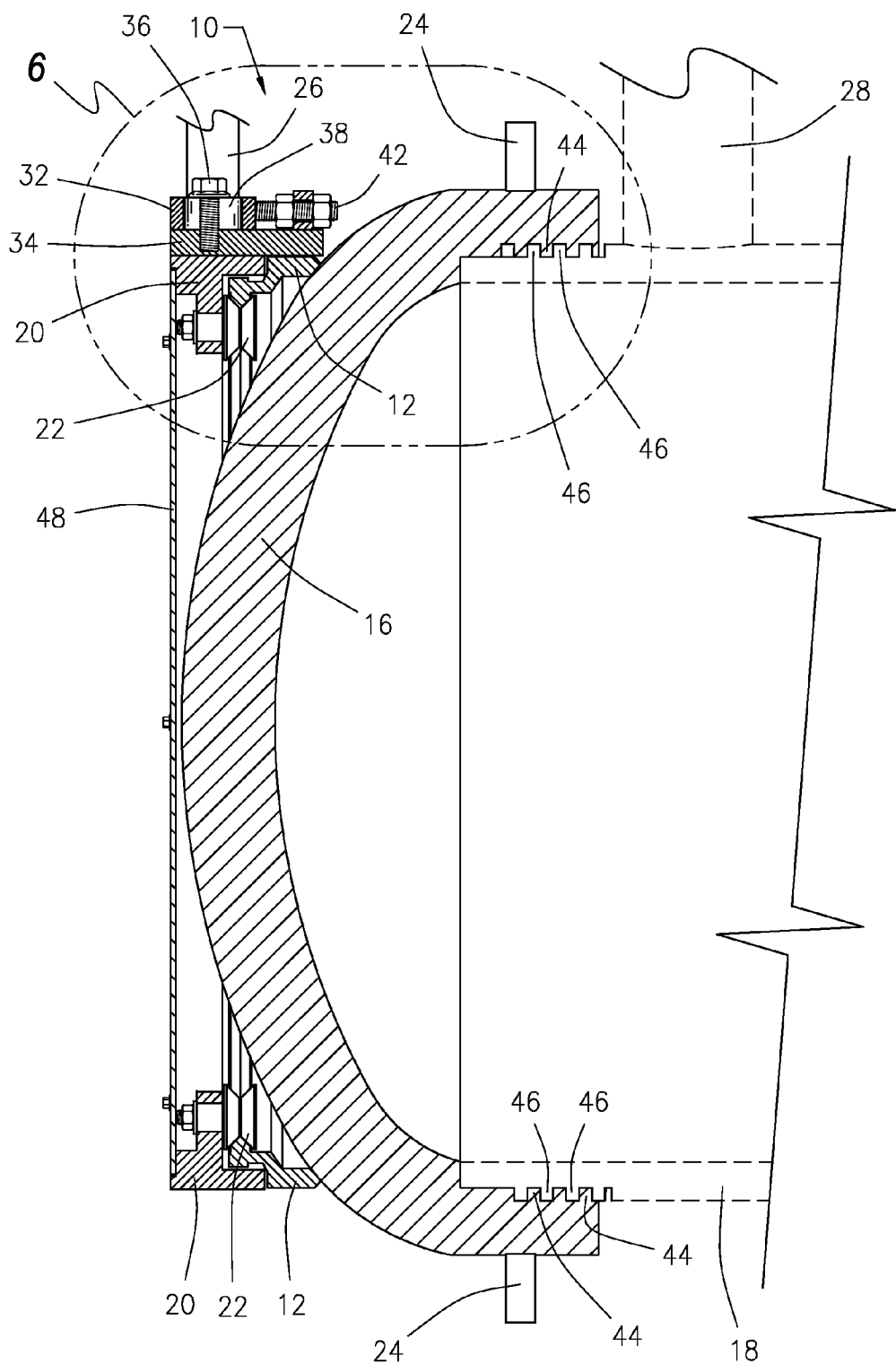
FIG. 5 is an enlarged and partially cut away, cross sectional view of the threaded closure of FIG. 3.
Figure 6:
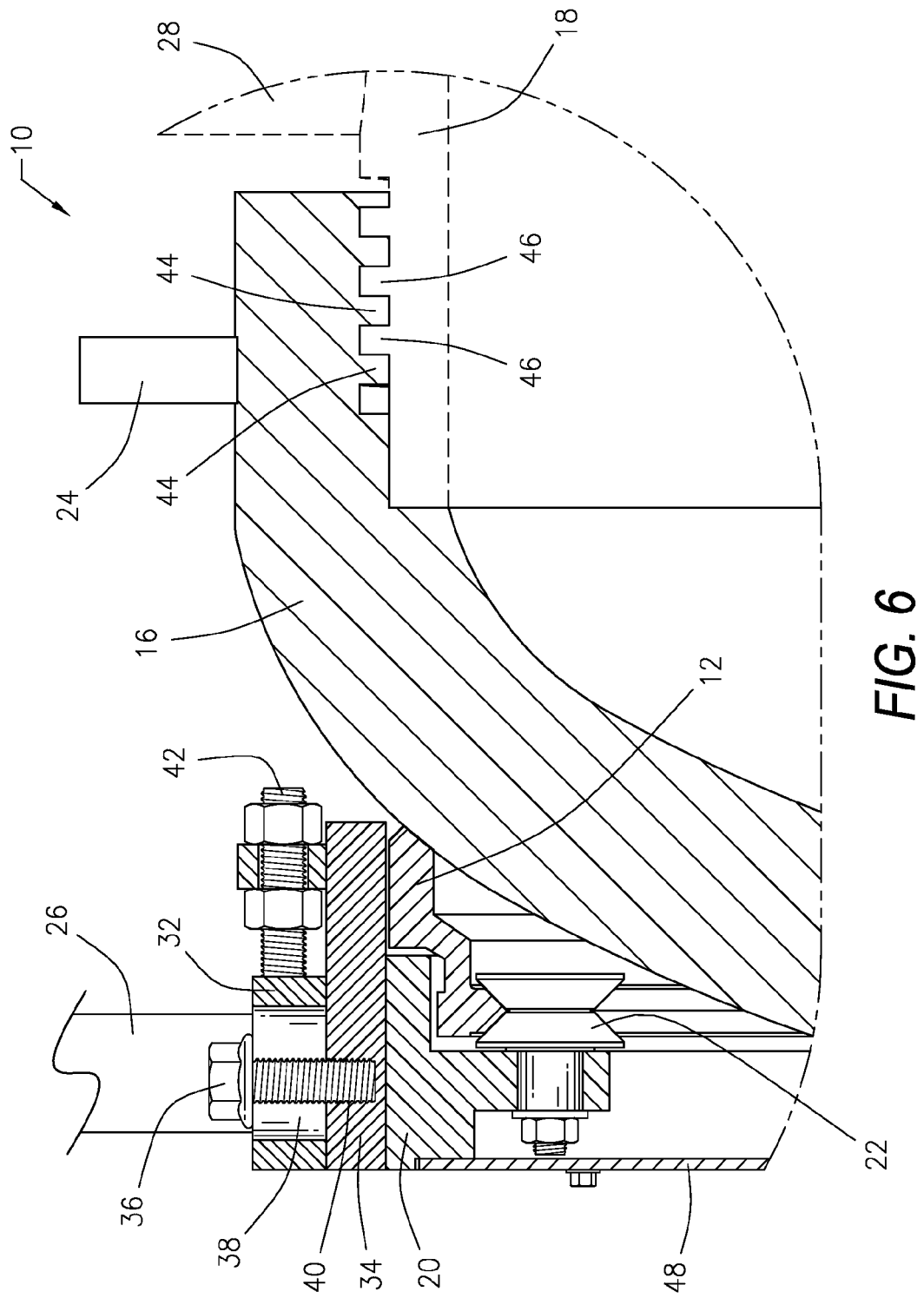
FIG. 6 is an enlarged view of the area within circle 6 of FIG. 5 showing the features in detail.
Figure 7:
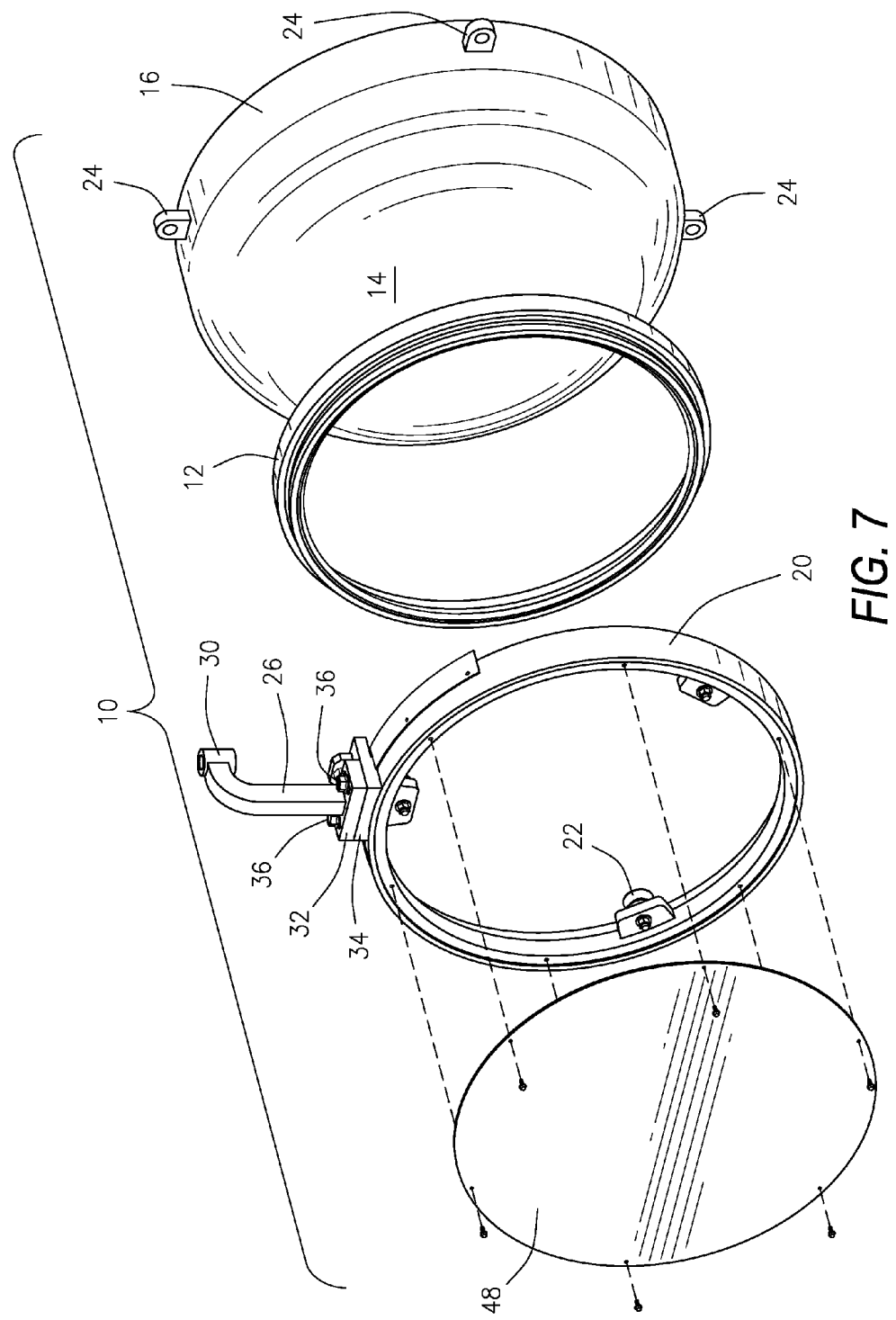
FIG. 7 is an exploded view of the threaded closure of FIG. 1.

Referring also to FIGS. 5, 6 and 7, the detailed structure of the threaded closure will be described. The threaded closure 10 employs a large diameter track ring 12 that is attached directly, preferably by welds, to a rear surface 14 of a female threaded head 16. The female threaded head 16 is designed to attach to a male threaded structure 18. The male threaded structure 18 may be any of a variety of large diameter pipes or vessels, such as those that might be found on scraper traps, large O.C. filter units, launchers, receivers, and other similar installations. The present invention also employs a bearing ring 20 to which are attached cam followers 22 that are associated with the track ring 12 such that the cam followers 22 movably engage the track ring 12 to allow the threaded head 16 to be rotated clockwise and counterclockwise relative to the male threaded structure 18.

By rotating the threaded head 16 in a counterclockwise manner, this loosens and removes the threaded head 16 from the male threaded structure 18. Alternately, by turning the threaded head 16 in a clockwise manner, this tightens and reattaches the threaded head 16 to the male threaded structure 18. A variety of lugs 24 are provided on the exterior of the threaded head 16 to facilitate lifting the threaded head 16 and to facilitate attaching tools thereto to tighten or loosen the threaded head 16 from the male threaded structure 18.

As illustrated in FIGS. 1, 2, and 3, the bearing ring 20 of the present invention is attached to a hinge arm 26 that in turn attaches to an overhead support member 28 provided on the male threaded structure 18. The hinge arm 26 in association with the overhead support member 28 allows the threaded head 16 to be moved horizontally linearly away from the male threaded structure 18 once the threaded head 16 is removed from the male threaded structure 18, as illustrated in FIGS. 1 and 2. Also, as illustrated in FIG. 2, the hinge arm 26 additionally includes a bearing 30 that allows the threaded head 16 to be rotated about a vertical axis once it is moved away from the male threaded structure 18.

Figure 4:
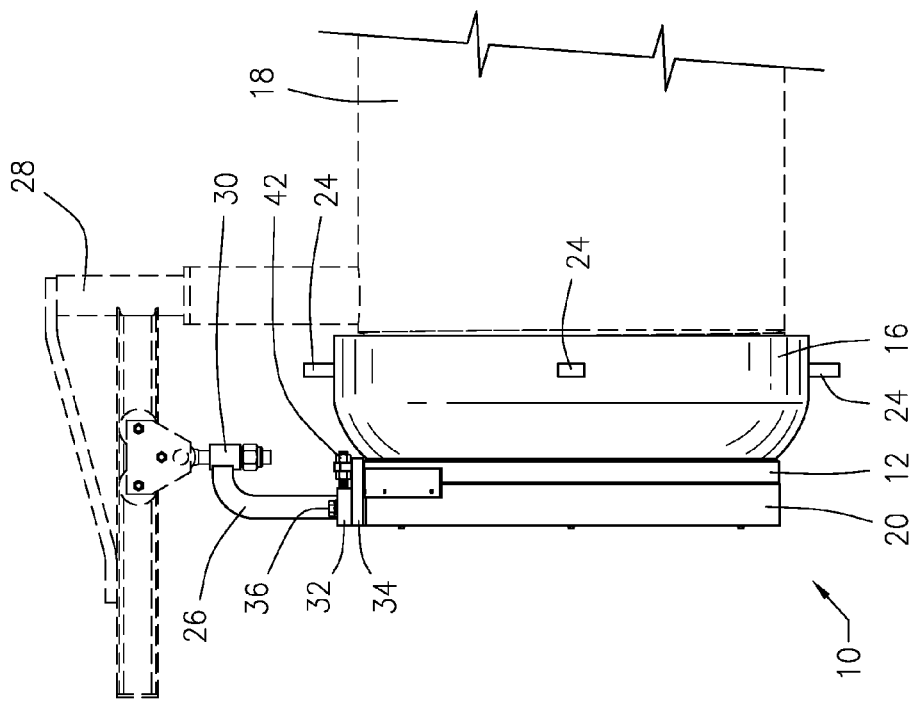
FIG. 4 is a side view of a prior art threaded closure similar to FIG. 3 to show the differences between the two closures.

Because of the direct attachment of the large diameter track ring 12 to the rear of the threaded head 16 of the present invention, the center of gravity is moved forward of its location on prior art female threaded closures such as the prior art threaded closure 50 shown in FIG. 4. This forward shift in the center of gravity on the threaded closure 10 results in the threaded head 16 remaining essentially vertical and not tilting to any great extent when it is removed from the male threaded structure 18, thereby facilitating quick and easy reattachment of the threaded head 16 to the male threaded structure 18.

The hinge arm 26 attaches to the bearing ring 20 via a couple of attachment plates 32 and 34. A first attachment plate 32 is secured to the hinge arm 26. First bolts 36 extend through longitudinal slits 38 provided in the first attachment plate 32 and secure into first bolt openings 40 provided in the second attachment plate 34 as a means of securing the first attachment plate 32 to the second attachment plate 34. The second attachment plate 34 is attached to the bearing ring 20. The two attachment plates 32 and 34 are longitudinally adjustable relative to each other by first slightly loosening the first bolts 36 and then rotating one or more longitudinal adjustment bolts 42 which are designed to move the two attachment plates 32 and 34 longitudinally relative to one another. Once the longitudinal adjustment bolts 42 have adjusted the desired relative position of the attachment plates 32 and 34, the first bolts 36 are retightened and the adjustment is complete.

Longitudinal adjustment of the attachment plates 32 and 34 allows for fine adjustment of the center of gravity of the threaded closure 10. By making fine adjustments to the center of gravity, this allows the operator to more precisely align the threaded head 16 into a vertical position when the threaded head 16 is separated from the male threaded structure 18 and before the threaded head 16 is threaded back onto the male threaded structure 18. Vertical positioning of the threaded head 16 makes realignment and reattachment of the threaded head 16 with the male threaded structure 18 easier by preventing cross-threading between the female threads 44 of the threaded head 16 and the associated male threads 46 of the male threaded structure 18.

A back plate 48 attaches to the bearing ring 20 to prevent dirt from reaching the cam followers 22 and also for safety reasons to prevent an operator from being injured. Also, as illustrated in FIG. 7, a rain guard may be provided at the top of the bearing ring 20 to shed water and prevent water from entering between the bearing ring 20 and the track ring 12. Although not illustrated, the back plate 48 may be provided with an external handle that can be gripped and serves as an aid in removing and replacing the back plate 48 from the bearing ring 20.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A horizontal hinged closure comprising:
   a track ring attached to the rear of a female threaded head wherein the female threaded head is designed to removably attach to a male threaded structure,
   a bearing ring with cam followers secured to the track ring so that the cam followers movably engage the track ring to allow the threaded head to be rotated relative to the male threaded structure when the threaded head is being attached to and detached from the male threaded structure,
   a hinge arm attached to the bearing ring and designed for attachment to a support structure provided on the male threaded structure, and
   said hinge arm attached to the bearing ring by means for adjusting the longitudinal position of the hinge arm relative to the bearing ring.

2. A horizontal hinged closure according to claim 1 wherein the means for adjusting the longitudinal position of the hinge arm relative to the bearing ring further comprises:
   a first attachment plate secured to the hinge arm, a second attachment plate secured to the bearing ring, and
   said first attachment plate provided with longitudinal slits extending therethrough into which first bolts insert and secure to the second attachment plate as a means of longitudinally adjusting the position of the first attachment relative to the second attachment plate.

3. A horizontal hinged closure according to claim 2 wherein the means for adjusting the longitudinal position of the hinge arm relative to the bearing ring further comprises:
   at least one longitudinal adjustment bolt engaging both the first and second attachment plates as a means of moving the first and second attachment plates longitudinally relative to each other.

4. A horizontal hinged closure comprising:
   a track ring attached to the rear of a female threaded head wherein the female threaded head is designed to removably attach to a male threaded structure,
   a bearing ring with cam followers secured to the track ring so that the cam followers movably engage the track ring to allow the threaded head to be rotated relative to the male threaded structure when the threaded head is being attached to and detached from the male threaded structure,
   a hinge arm attached to the bearing ring and designed for attachment to a support structure provided on the male threaded structure, and
   a back plate removably attached to said bearing ring.

5. A horizontal hinged closure comprising:
a track ring attached to the rear of a female threaded head wherein the female threaded head is designed to removably attach to a male threaded structure,
a bearing ring with cam followers secured to the track ring so that the cam followers movably engage the track ring to allow the threaded head to be rotated relative to the male threaded structure when the threaded head is being attached to and detached from the male threaded structure,
a hinge arm attached to the bearing ring and designed for attachment to a support structure provided on the male threaded structure,
a bearing provided in the hinge arm which allows the threaded head to be rotated about a vertical axis once it is detached from and moved away from the male threaded structure,
said hinge arm attached to the bearing ring by means for adjusting the longitudinal position of the hinge arm relative to the bearing ring.

6. A horizontal hinged closure according to claim 5 wherein the means for adjusting the longitudinal position of the hinge arm relative to the bearing ring further comprises:
a first attachment plate secured to the hinge arm, a second attachment plate secured to the bearing ring, and
said first attachment plate provided with longitudinal slits extending therethrough into which first bolts insert and secure to the second attachment plate as a means of longitudinally adjusting the position of the first attachment relative to the second attachment plate.

7. A horizontal hinged closure according to claim 6 wherein the means for adjusting the longitudinal position of the hinge arm relative to the bearing ring further comprises:
at least one longitudinal adjustment bolt engaging both the first and second attachment plates as a means of moving the first and second attachment plates longitudinally relative to each other.

8. A horizontal hinged closure according to claim 5 further comprising:
lugs provided externally on said female threaded head as a means of lifting and turning said female threaded head.

9. A horizontal hinged closure according to claim 5 further comprising:
a back plate removably attached to said bearing ring.

10. A horizontal hinged closure according to claim 5 further comprising:
a bearing provided in the hinge arm which allows the threaded head to be rotated about a vertical axis once it is detached from and moved away from the male threaded structure.

11. A horizontal hinged closure according to claim 5 further comprising:
lugs provided externally on said female threaded head as a means of lifting and turning said female threaded head.

* * * * *